Aug. 28, 1951     I. N. EUSTIS     2,566,177
BELT TIGHTENER
Filed March 15, 1945     2 Sheets-Sheet 1
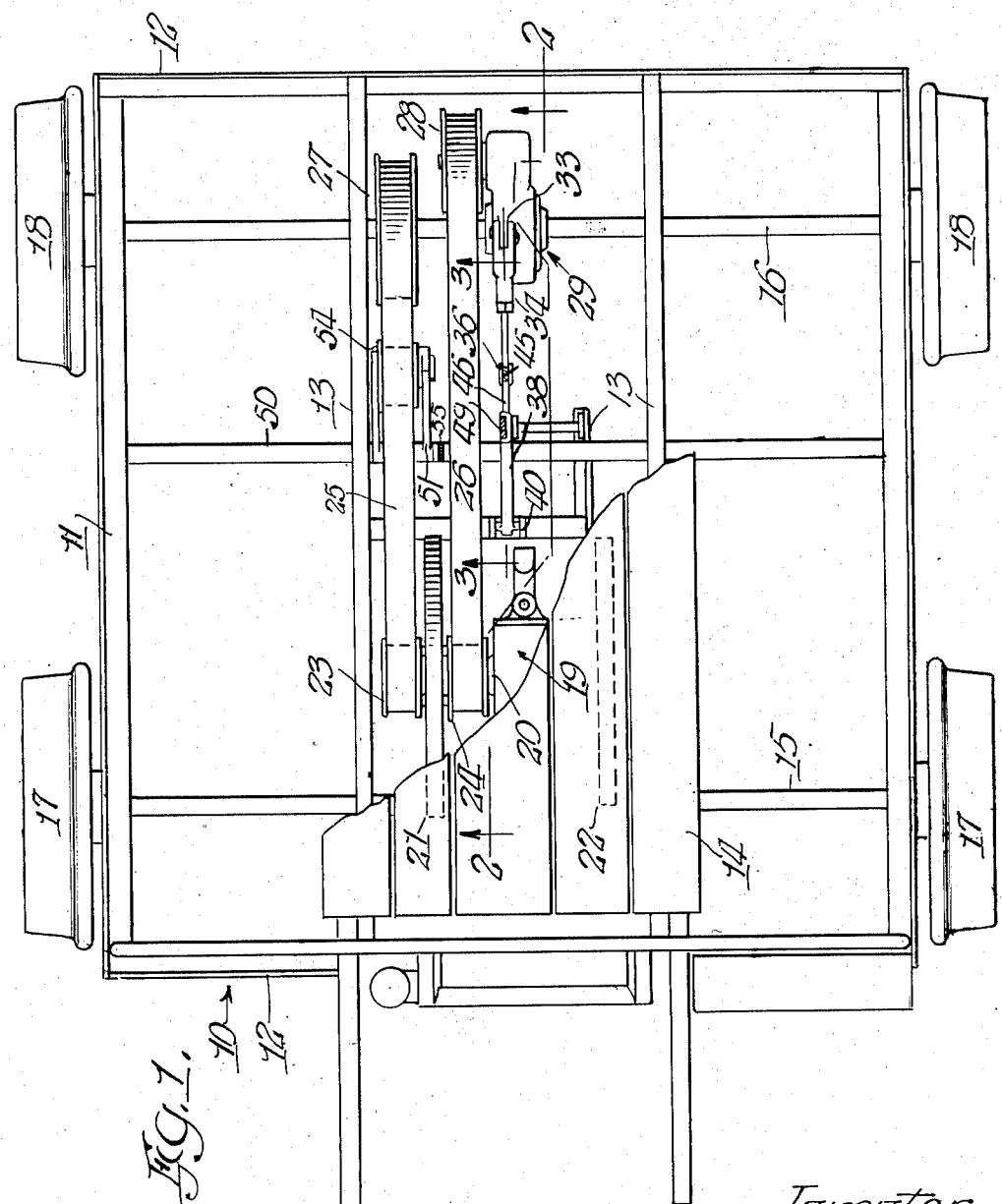

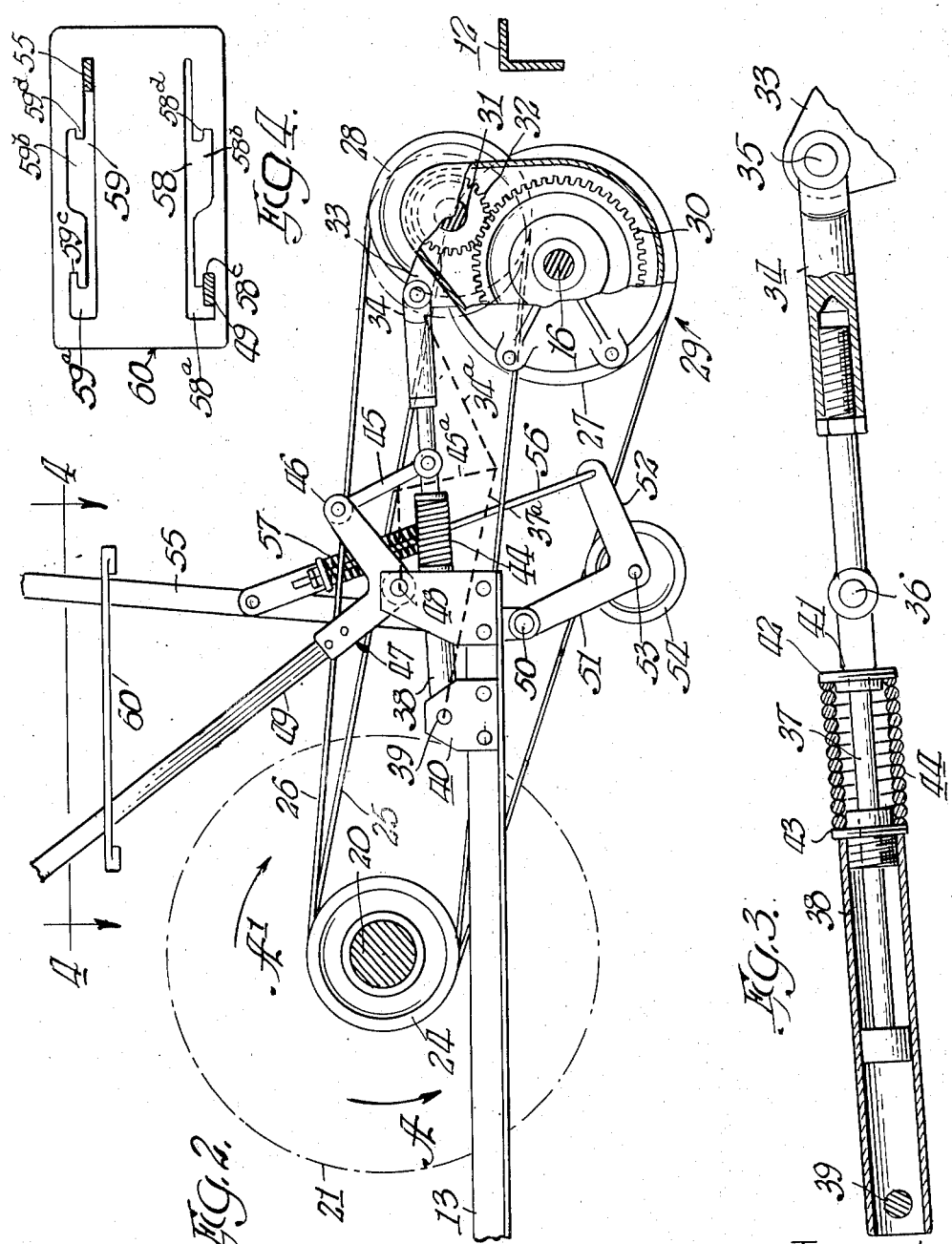

Patented Aug. 28, 1951

2,566,177

UNITED STATES PATENT OFFICE 2,566,177

BELT TIGHTENER

Irving N. Eustis, Fairmont, Minn., assignor to Fairmont Railway Motors, Inc., Fairmont, Minn., a corporation of Minnesota Application March 15, 1945, Serial No. 582,840

5 Claims. (Cl. 74—242.15)

1

This invention relates to improvements in railway motor cars, and it consists of the matters hereinafter described and more particularly pointed out in the appended claims.

Among the many uses of railway motor cars is the inspection of track and signal circuits and, in this work, the car must travel back and forth along the track. Usually the motive power of the car is an internal combustion engine of the two stroke cycle type which can readily be caused to run in either direction. Its crank shaft generally has a pulley fixed thereto for driving a pulley on the driving axle of the car through a belt. By a suitable lever means the belt may be tightened so as to drive the car ahead at a one ratio to engine speed, or said lever means may be actuated to slacken the belt so that the car may be stopped by the brakes provided therefor.

To reverse the direction of movement of the car when set for movement in a forward direction (assuming the engine to be of the kind mentioned), the operators often resort to slackening the belt and opening the ignition switch with the spark advanced for the direction he was traveling and then closing said switch just before the engine stops. As the engine is running slowly, the spark will explode the mixture in the combustion chamber of the engine ahead of dead center and this will reverse the engine. If the engine does not start in the other direction and stalls, the operator simply cranks the engine in said other direction and this drives the car in reverse direction, but at the same ratio as before with respect to engine speed.

As the engines used are generally relatively small in horse power, upgrade in track and head winds are perceptibly felt by a slowing down in the speed of the car. Sometimes such cars pull a tool car or a trailer. On relatively level track such cars may be pushed or pulled without difficulty but often upon upgrade and against head winds the load imposed by such cars so reduces speed of travel as to make the car impractical.

One of the objects of the present invention is to provide a railway motor car embodying parts which may be manipulated by the operator for quickly reversing the direction of movement of the car without having to first bring the car to a complete stop and without the necessity of shifting gears.

Another object of the invention is to provide in a car of this kind, a simple and efficient transmission whereby the car, when driven in a reverse direction, may be driven through a gear

2 different from that of the normal forward direction drive.

Also, it is an object of the invention to provide in a car of this kind a simple and efficient transmission which, upon a reversal of direction of the engine, is operated to drive the car in a forward or go ahead direction with a speed reduction enabling the car to proceed with greater ease upon upgrades and against stronger head winds.

Furthermore, it is an object of the invention to provide in a railway motor car an arrangement of parts including a speed reducing means and whereby the car may be driven either forward or backward at one speed and either forward or backward at another speed.

Again it is an object of the invention to provide a car of this kind including parts whereby a two speed gear is available to the operator at all times and in either direction of movement of the car.

The above mentioned objects of the invention, as well as others, together with the advantages thereof, will more fully appear as the specification proceeds.

In the drawings:

Fig. 1 is a plan view of a railway motor car embodying the preferred form of the invention with parts broken away better to illustrate the same.

Fig. 2 is a longitudinal vertical sidewise view on an enlarged scale through a part of the motor car, as taken on the lines 2—2 of Fig. 1.

Fig. 3 is a detail vertical sectional view on a further enlarged scale as taken on the line 3—3 of Fig. 1.

Fig. 4 is a detail horizontal sectional view as taken on the line 4—4 and on the scale of Fig. 2.

In general the improved railway motor car includes the usual framing and pairs of front and rear wheels for travel upon a railroad track and one of said pairs of wheels is mounted upon the driven axle of the car. The motive power is preferably, though not necessarily, furnished by a two stroke cycle internal combustion engine, because the crank shaft of such engines may be caused to run in either direction by cranking in appropriate direction with the ignition properly set for operation in that direction. Since such construction is well known, it has not been thought necessary to illustrate the same. The driven axle of the car is provided with a driving member in the form of a pulley disposed in line with and operatively connected by a belt to a pulley on the crank shaft of the engine. Suitable lever operated means is provided to cooperate with the belt so as to either tighten or slacken the belt, to drive or not to drive said axle.

Mounted on the axle so as to be capable of a limited rocking movement about its axis is a gear casing enclosing a relatively large gear fixed to said axle and a smaller gear that meshes therewith, said smaller gear being carried by a shaft journalled in the casing. A part of this shaft is arranged outside said casing and has a driving member in the form of a pulley fixed thereto. This driving member is disposed in line with another pulley on the crank shaft of the engine and is operatively connected thereto by a second belt. Lever operated means is so operatively connected to the gear case as to cause the same to be swung or rocked in either direction and said means is locked in one limit of its movement to hold the gear case in operative position, gravity holding the gear case in its released inoperative position. At the limit of movement in one direction the belt is tightened to a degree whereby it drives the pulley of the gear case and, through the gearing, drives the axle in a direction opposite that of the crank shaft. At the limit of movement in the other direction, the belt is so slackened as to slip on the associated pulley no matter in which direction the crank shaft of the engine may happen to be driven.

By the means mentioned, when the engine runs in one direction and drives through one belt, the car is driven in the ahead or forward direction. With the engine running in the same direction and driving through the other belt, the car is driven in reverse or backward at a reduced speed. When the engine is running in the other direction and is driving through the first mentioned belt, the car is driven in reverse or backward at the same speed as forward. When the engine is running in the other direction and is driving through the second mentioned belt, the car is driven forward at a reduced speed. Thus the car may be driven forward or backward at the same speed or forward and backward at a reduced speed, all without the necessity of shifting gears.

Referring now in detail to that embodiment of the invention illustrated in the accompanying drawings, 10 indicates as a whole the framing of a railway motor car, and which framing includes a pair of side members 11—11, a pair of front and rear end members 12 and 12 respectively, and intermedial members 13—13 parallel with the side members. Above the intermedial members 14 is provided a seat member 14, only a front end part of which appears in Fig. 1.

15 and 16 indicate the front and rear axles of the car and which are suitably journalled for rotation in parts fixed with respect to the framing. The axle 15, which is the non-driving axle, has wheels 17—17 fixed to the ends thereof, and the axle 16, which is the driving axle has wheels 18—18 fixed to the ends thereof. The wheels 17 and 18 are spaced for travel upon the rails of a railroad track and are disposed laterally outward of the side members 11—11 of the framing as best appears in Fig. 1.

Disposed on parts of the framing of the car, at the front end thereof, beneath the seat, is the driving motor 19 of preferably, though not necessarily, a two stroke cycle internal combustion engine for reasons previously mentioned. This engine includes a crank shaft 20 that extends parallel with the axles 15 and 16, respectively and includes a fly-wheel 21—22 at each end. Such an engine is capable of being caused to run in one direction or the other, either by manipulating the timer (not shown) of the engine and by cranking in the appropriate direction if necessary.

Pulleys 23 and 24 of substantially the same diameter are fixed, each to opposite sides of the fly wheel 21 and these pulleys are formed for operative engagement by flat belts 25 and 26, respectively. The belt 25 also passes about a pulley 27 fastened to the rear axle and the belt 26 also passes about a pulley 28 that forms a part of and is driven from a reversing gearing in a casing 29 associated with the rear axle.

The casing 29, which is a closed casing, contains, as best shown in Fig. 2, a gear 30 which is fixed to a part of the rear axle. The ends of this gear are journalled in antifriction bearings (not shown) supported and enclosed in opposite sides of the casing. By reason of the structure mentioned it is obvious that the casing 29 and the axle 16 are capable of a relative rotation so that said casing may be rocked about the axis of said axle. 31 indicates a stub shaft that is parallel with the rear axle and is journalled in antifriction bearings (not shown) supported by and enclosed in opposite sides of the casing. A part of the stub shaft 31 extends beyond one side of the casing and the pulley 28, before mentioned, is fixed thereto. Fixed to the shaft 31 in said casing is a gear 32 that meshes with but is of a diameter less than that of the other gear 30 in said casing. These gears best appear in Fig. 2.

That end of the casing 29 containing the gear 32 is provided on its upper side with an ear 33 and an adjustable link 34 is pivoted to the ear as at 35. The other end of said link is pivoted as at 36 to one end of a plunger 37, the other end of which has sliding engagement in one end of a swinging guide tube 38. The other end of said tube is pivoted as at 39 between upstanding ears 40 suitably supported from a fixed part of the framing. The first mentioned end of the plunger has a shoulder 41 thereon against which is engaged a collar 42, a similar collar 43 being fixed in the associated end of the guide tube. The plunger 37 slides through these collars and surrounding said plungers between said collars is an expansion spring 44. The parts described provide an extensible and contractible link having a knuckle therein constituted by the pivot 36 and by which one end of a link 45 (see Fig. 2) is connected thereto.

The other end of said link is pivoted to the arm 46 of a bell crank lever 47 which is mounted for rocking movement on a pivot 48 rising from a part of the framing, as best appears in Fig. 2. The other arm of the bell crank 47 is provided with a lever-like operating handle 49.

50 indicates a cross shaft with which is operatively connected a pair of laterally spaced arms, one of which includes an angular extension 52. Said pair of arms carries a shaft 53 upon which a pulley 54 is journalled so as to be engageable with the underside of the bottom lap of the belt 25.

55 indicates a generally upwardly extending lever which is so pivoted at its bottom end as to be swung forwardly and rearwardly of the car and a link 56 with a cushioning element 57 therein operatively connects the extension 52 of the bell crank arm with said lever.

The levers 49 and 55, which are in the form of flat bars, extend up through associated slots 58 and 59 respectively in a control plate 60, such as shown in Fig. 4 and which plate is set in a central part of the seat 14. Each slot is formed with lateral enlargements 58a—58b and 59a—59b respectively. At said enlargements are sets of end and intermediate recesses 58c—58d and 59c—59d respectively, each to hold a part of the associated lever 49—55 to lock it against movement, providing the desired tightness for the associated belt.

In Fig. 2, the lever 55 is in that position providing a slack condition for the associated belt 25 so that even though the engine 19 is running, the belt 25 is ineffective to transmit driving power to the pulley 27. When the lever 55 is swung counterclockwise when viewed as in Fig. 2, this causes the arm 51 to swing therewith so as to cause the pulley to tighten the belt 25 so as to transmit power to the pulley 27 and drive the car either forward or rearward at the same speed ratio according to the direction in which the engine 19 is running.

In said Fig. 2 the lever 49 is shown as having been swung counterclockwise to the limit of its movement and where it is held in this position by its engagement in the notch or recess 58c. At this time the parts 34, 37 and 38 are disposed in a condition to rock the casing 29 about the axis of the axle 16, clockwise and thus tighten the belt 26 so that it transmits power to the pulley 28, which through the shaft 31 and gear 32 drives the gear 30 that is fixed to the axle as before mentioned. With the parts in this condition no matter in which direction the crank shaft 20 of the engine is rotating, the axle 16 is driven in the opposite direction at a reduction in speed.

When the lever 49 is released from its recess 58a in the slot 58 and is swung clockwise, as viewed in Fig. 2, the member 45 presses downwardly on the pivotal connection 36 and moves it into the position indicated by the dotted lines 45a—34a and 37a in Fig. 2. This causes the casing 29 to swing counterclockwise so that the pulley 28 releases its tightening action on the belt 26 which becomes slackened and ineffective to transmit power to said pulley. The parts are held in this position by reason of the engagement of the lever 49 in the recess 58d at the other end of its slot 58 in the plate 60.

It is pointed out at this time that when the fly wheel 21 is rotating in one direction, either belt 25—26 when tightened will drive its associated pulley 27—28 in the same direction. However, when the belt 25 is the driving belt, the axle 16 is driven in the direction of rotation of the flywheel 21. When the belt 26 is the driving belt and the flywheel is rotating in the same direction as above mentioned, the axle 16 is driven through the gears 30—32 at a lower speed and in an opposite direction.

In the operation of the mechanism described, when the engine fly wheel is being driven in the direction of the arrow A, which indicates "forward" in Fig. 1, when the belt 25 has been tightened and the belt 26 has been loosened, said belt 25 drives its pulley 27 and the axle 16 in the same direction (forward) as the rotation of the fly wheel. This propels the car forward.

With the engine fly wheel running in the same direction, and the belt 25 is slackened and the belt 26 tightened, the pulley 28 is driven in the same direction but by reason of the gears 32 and 30 the axle 16 is driven in the opposite direction at a lower speed. This propels the car rearwardly at a reduced speed.

When the engine fly wheel is being driven in the direction of the arrow A1 which indicates "reverse" in Fig. 2, and the belt 25 is tightened and the belt 26 has been slackened, the belt 25 drives the pulley 27 and axle 16 in the same direction to provide a reverse drive for the car at the same speed as its normal forward drive.

When the engine fly wheel is running in the direction of the arrow A1 in Fig. 2, when the belt 25 has been slackened and the belt 26 has been tightened, this will drive the car forward at a reduced speed.

By means of the mechanism described, it is possible, with the engine running at the same R. P. M. in one direction to drive the car in forward direction at one speed and backward at a reduced speed and when the engine is running in reverse, to drive the car backward at the same speed as normal forward, or forward at a reduced speed.

The improved construction thus provides many advantages because when heavy grades and head winds tend to stall the car, the operator by causing his engine to run in the proper direction and by manipulating the levers 49—55 provides a reduced speed by which the car can travel such grades and run properly against such head winds.

Should the operator become confused in his manipulation of the levers 49—55, nothing more serious than a stalling of the engine can occur. With the arrangement described, belts of substantially the same length may be employed, which is an economic advantage.

While in describing the invention I have referred in detail to the form, arrangement and construction of the parts involved, the same is to be considered only in the illustrative sense so that I do not wish to be limited thereto except as may be specifically set forth in the appended claims.

I claim as my invention:

1. In combination with a driven shaft, mechanism mounted on said shaft for rocking movement and including a member on said shaft and a second member for driving the first mentioned member, means including a belt for driving said second member, a toggle joint structure including links pivotally connected together at their inner ends, the outer ends of said links being pivotally connected to said mechanism and to a fixed point respectively, said links when substantially in line with each other, holding said mechanism in belt tightening position, and when out of line with each other releasing said mechanism from belt tightening position to loosen said belt, means including a lever connected to said toggle joint structure for swinging said links into and out of line with each other, and means included in one of said links for resiliently extending the length of said links when in line with each other to urge said mechanism to swing in a direction tightening said belt.

2. In combination with a driven shaft, mechanism mounted on said shaft for rocking movement and including a member on said shaft and a second member for driving the first mentioned member, means including a belt for driving said second member, a toggle joint structure including links pivotally connected together at their inner ends, the outer ends of said links being pivotally connected to said mechanism and to a fixed point respectively, said links when substantially in line with each other holding said mechanism in belt tightening position, and when out of line with each other releasing said mechanism from belt tightening position to loosen said belt, means including a lever connected to said toggle joint structure for swinging said links into and out of line with each other, means engageable by said lever for locking the same against movement when said links are in line with each other, and means included in one of said links for resiliently extending the length of said links when in line with each other to urge said mechanism to swing in a direction tightening said belt.

3. In combination with a driven shaft, mechanism mounted on said shaft for rocking movement and including a member on said shaft and a second member for driving the first mentioned member, means including a belt for driving said second member, a toggle joint structure including links pivotally connected together at their inner ends, the outer ends of said links being pivotally connected to said mechanism and to a fixed point respectively, said links when substantially in line with each other, holding said mechanism in belt tightening position, and when out of line with each other releasing said mechanism from belt tightening position to loosen said belt, means including a lever connected to said toggle joint structure for swinging said links into and out of line with each other, one of said links including telescopic parts and means for resiliently extending the length of said links when in line with each other to urge said mechanism to swing in a direction tightening said belt.

4. In combination with a driven shaft, mechanism mounted on said shaft for rocking movement and including a member on said shaft and a second member for driving the first mentioned member, means including a belt for driving said second member, a toggle joint structure including links pivotally connected together at their inner ends, the outer ends of said links being pivotally connected to said mechanism and to a fixed point respectively, said links when substantially in line with each other, holding said mechanism in belt tightening position, and when out of line with each other releasing said mechanism from belt tightening position to loosen said belt, means including a lever connected to said toggle joint structure for swinging said links into and out of line with each other, one of said links including telescopically engaged parts and a spring engaged therewith for resiliently extending the length of said links when in line with each other to urge said mechanism in a direction tightening said belt.

5. In combination with a driven shaft, mechanism mounted on said shaft for rocking movement and including a member on said shaft and a second member for driving the first mentioned member, means including a belt for driving said second member, a toggle joint structure including links pivotally connected together at their inner ends, the outer ends of said links being pivotally connected to said mechanism and to a fixed point respectively, said links when substantially in line with each other holding said mechanism in belt tightening position, and when out of line with each other releasing said mechanism from belt tightening position to loosen said belt, means including a lever connected to said toggle joint structure for swinging said links into and out of line with each other, one of said links including a tubular part, a second part telescopically slidable therein and a spring disposed between said parts for resiliently extending the length of said links when in line with each other to urge said mechanism in a direction tightening said belt.

IRVING N. EUSTIS.

REFERENCES CITED

The following references are of record in the file of this patent:

UNITED STATES PATENTS

| Number | Name | Date |
| --- | --- | --- |
| 572,051 | Duryea | Nov. 24, 1896 |
| 804,980 | Reiss | Nov. 21, 1905 |
| 879,005 | Rockstroh | Feb. 11, 1908 |
| 1,376,902 | Quinn | May 3, 1921 |
| 1,415,083 | Beetem | May 9, 1922 |
| 1,422,809 | Anderson | July 18, 1922 |
| 1,450,019 | Canning | Mar. 27, 1923 |
| 1,650,545 | Srote | Nov. 22, 1927 |
| 1,707,119 | Good | Mar. 26, 1929 |
| 2,050,776 | Anderson | Aug. 11, 1936 |